United States Patent
Kim et al.

(10) Patent No.: US 12,227,421 B2
(45) Date of Patent: Feb. 18, 2025

(54) GRAPHITE SHEET PRODUCED FROM POLYIMIDE FILM HAVING EXCELLENT ORIENTATION PROPERTIES, AND METHOD FOR PRODUCING SAME

(71) Applicant: PI Advanced Materials Co., Ltd., Iwol (KR)

(72) Inventors: Kyung Su Kim, Iwol (KR); Dong Young Won, Iwol (KR)

(73) Assignee: PI Advanced Materials Co., Ltd., Iwol (KR)

( * ) Notice: Subject to any disclaimer, the term of this patent is extended or adjusted under 35 U.S.C. 154(b) by 754 days.

(21) Appl. No.: 17/298,489

(22) PCT Filed: Oct. 28, 2019

(86) PCT No.: PCT/KR2019/014273
§ 371 (c)(1),
(2) Date: May 28, 2021

(87) PCT Pub. No.: WO2020/111529
PCT Pub. Date: Jun. 4, 2020

(65) Prior Publication Data
US 2022/0017371 A1 Jan. 20, 2022

(30) Foreign Application Priority Data

Nov. 30, 2018 (KR) .................. 10-2018-0152538
Nov. 30, 2018 (KR) .................. 10-2019-0073519

(51) Int. Cl.
| | | |
|---|---|---|
| *C01B 32/205* | (2017.01) | |
| *B29C 55/00* | (2006.01) | |
| *B29C 55/06* | (2006.01) | |
| *C08J 5/18* | (2006.01) | |
| *B29K 79/00* | (2006.01) | |
| *B29L 7/00* | (2006.01) | |

(52) U.S. Cl.
CPC .......... *C01B 32/205* (2017.08); *B29C 55/005* (2013.01); *B29C 55/06* (2013.01); *C08J 5/18* (2013.01); *B29K 2079/08* (2013.01); *B29L 2007/008* (2013.01); *C01P 2006/32* (2013.01); *C08J 2379/08* (2013.01)

(58) Field of Classification Search
CPC .................................................. C01B 32/205
See application file for complete search history.

(56) References Cited

U.S. PATENT DOCUMENTS 9,540,285 B2 * 1/2017 Ohta .................. C08G 69/28

FOREIGN PATENT DOCUMENTS

| | | |
|---|---|---|
| JP | 2006232587 A | 9/2006 |
| KR | 20160081033 A | 7/2016 |
| KR | 101883434 B1 | 7/2018 |
| KR | 101907320 B1 | 10/2018 |
| KR | 101912737 B1 | 10/2018 |
| WO | 2005023713 A1 | 3/2005 |
| WO | 2011007510 A1 | 1/2011 |

OTHER PUBLICATIONS

International Search Report and Written Opinion received in PCT/KR2019/014273 dated Feb. 4, 2020 (Engl. translation of ISR only).
[English Translation] Notice of Reasons for Refusal mailed on May 24, 2022 for Japanese Patent Application No. 2021-531044.

* cited by examiner

*Primary Examiner* — Stuart L Hendrickson
(74) *Attorney, Agent, or Firm* — Dorsey & Whitney LLP

(57) ABSTRACT

Disclosed are a graphite sheet formed from a polyimide film having a molecular orientation ratio of at least about 1.25, and a method for producing the same.

3 Claims, No Drawings

GRAPHITE SHEET PRODUCED FROM POLYIMIDE FILM HAVING EXCELLENT ORIENTATION PROPERTIES, AND METHOD FOR PRODUCING SAME

RELATED APPLICATIONS

This application is a U.S. National Stage filing under 35 U.S.C. § 371 of PCT Application No. PCT/KR2019/014273, filed Oct. 28, 2019, which claims priority to Korean Application No. 10-2018-0152538 filed Nov. 30, 2018, and Korean Application No. 10-2019-0073519 filed Nov. 30, 2018, which applications are incorporated herein by reference in their entirety, for any purpose.

TECHNICAL FIELD

The present disclosure relates to a method for producing a polyimide film having excellent orientation, a polyimide film produced thereby, and a graphite sheet produced using the same.

BACKGROUND ART

In recent years, the structures of electronic devices have gradually become lighter in weight, smaller in size, thinner in thickness, and higher in integration density, and thus many problems have arisen due to heat load caused by an increase in the amount of heat generated per unit volume. Representative examples of these problems include those that directly affect the performance of electronic devices, such as a decrease in the operation speed of a semiconductor device due to the heat load of the electronic device, and a shortened life due to deterioration of a battery.

For this reason, effective heat dissipation from electronic devices has emerged as one of the very important tasks.

As heat dissipation means for use in the electronic devices, graphite having excellent thermal conductivity has attracted attention. In particular, an artificial graphite sheet has attracted attention. The artificial graphite sheet is easy to process into a sheet form and has a thermal conductivity which is about 2 to about 7 times higher than the thermal conductivity of copper or aluminum.

This artificial graphite sheet may be generally obtained through polymer carbonization and graphitization processes. Among the polymers, a heat-resistant polymer capable of withstanding a temperature of about 400° C. or higher may be used as a graphite precursor. Representative examples of this heat-resistant polymer include polyimide (PI).

Polyimide is a polymer material that is based on a rigid aromatic main chain together with an imide ring having very excellent chemical stability and has the highest heat resistance, chemical resistance, electrical insulation, and weather resistance properties among organic materials. Polyimide is known as an optimal graphite precursor that enables excellent yield, crystallinity and thermal conductivity when producing an artificial graphite sheet.

In general, it is known that the physical properties of the artificial graphite sheet are greatly affected by the physical properties of the graphite precursor polyimide. Thus, improvements in polyimide have been actively made to improve the physical properties of the artificial graphite sheet, and in particular, many studies have been conducted to improve the thermal conductivity of the artificial graphite sheet.

Nevertheless, there is no noticeable result in the development of an artificial graphite sheet having a very high thermal conductivity that can significantly improve the performance of an electronic device due to heat dissipation and the development of a polyimide that enables the implementation thereof.

Accordingly, there is a need to develop an artificial graphite sheet having a desired thermal conductivity and a polyimide that enables the implementation thereof.

DISCLOSURE

Technical Problem

In one aspect of the present disclosure, a production method of the present disclosure may produce a polymer film in which polymer chains are packed densely together and oriented in a certain direction, by optimally controlling the reaction time of monomers for polyamic acid polymerization, and heat-treating a film intermediate, which is a precursor of the polyimide film, under optimal process conditions.

The polyimide film produced according to the present disclosure has excellent orientation corresponding to a molecular orientation ratio of about 1.25 or more, which can be concluded that a graphite sheet subsequently produced from the polyimide film exhibits excellent thermal conductivity as described below.

According to this aspect, the above-described problems occurring in the prior art may be solved, and thus a substantial object of the present disclosure is to provide specific embodiments of this aspect.

Technical Solution

In one embodiment, the present disclosure provides a method for producing a polyimide film, the method including steps of:
(a) dissolving a first monomer in an organic solvent;
(b) producing a polymer by adding a second monomer in portions into the organic solvent containing the first monomer dissolved therein, in an amount of about 93 mol % to about 99 mol % relative to the total moles of the first monomer, followed by allowing to stand for a predetermined time;
(c) further adding the second monomer to the polymer produced in step (b) so that the first and second monomers are substantially equimolar;
(d) obtaining a precursor composition containing polyamic acid by allowing the polymer produced in step (c) to stand for a predetermined time; and
(e) obtaining a polyimide film from the precursor composition,
wherein the ratio between the time required ($T_b$) in step (b), the time required ($T_c$) in step (c) and the allowing-to-stand time ($T_d$) in step (d), ($T_b$:$T_c$:$T_d$), is about 1.0 to about 1.5:about 1.5 to about 2.5:about 0.05 to about 0.15.

In one embodiment, the present disclosure provides a polyimide film produced by the above-described production method and having a molecular orientation ratio of about 1.25 or more.

In one embodiment, the present disclosure provides a graphite sheet produced by carbonizing and/or graphitizing the polyimide film and having a thermal conductivity of about 1,400 W/m·K or more.

Hereinafter, embodiments of the present disclosure will be described in more detail in the order of "a method for producing a polyimide film" and a "polyimide film" according to the present disclosure.

The terms or words used in the present specification and the claims should not be interpreted as being limited to usual meanings or dictionary definitions, but should be interpreted as having meanings and concepts relevant to the technical scope of the present disclosure, based on the principle according to which the inventors can appropriately define the meaning of the terms to describe their invention in the best manner.

Accordingly, it should be understood that the embodiments described in the specification are merely preferred examples, but not cover all the technical spirits of the present disclosure, and thus there may be various equivalents and modifications capable of replacing them at the time of filing of the present disclosure.

In the present disclosure, singular expressions include plural expressions unless the context clearly indicates otherwise. In the present specification, it should be understood that terms such as "include", "comprise" or "have" are intended to denote the existence of mentioned characteristics, numbers, steps, components, or combinations thereof, but do not exclude the probability of existence or addition of one or more other characteristics, numbers, steps components, or combinations thereof.

In the present specification, "dianhydride" is intended to include a precursor or derivative thereof, which may not technically be a dianhydride, but will nevertheless react with diamine to form polyamic acid, which may in turn be converted into polyimide.

In the present specification, "diamine" is intended to include a precursor or derivative thereof, which may not technically be a diamine, but will nevertheless react with dianhydride to form polyamic acid, which may in turn be converted into polyimide.

In the present disclosure, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

In the present disclosure, "to" in "a to b" representing a numerical range is defined as ≥a and ≤b.

Method for Producing Polyimide Film

The method for producing a polyimide film according to the present disclosure includes steps of:
(a) dissolving a first monomer in an organic solvent;
(b) producing a polymer by adding a second monomer in portions into the organic solvent containing the first monomer dissolved therein, in an amount of about 93 mol % to about 99 mol % (for example, about 93, about 94, about 95, about 96, about 97, about 98, or about 99 mol %) relative to the total moles of the first monomer, followed by allowing to stand for a predetermined time;
(c) further adding the second monomer to the polymer produced in step (b) so that the first and second monomers are substantially equimolar;
(d) obtaining a precursor composition containing polyamic acid by allowing the polymer produced in step (c) to stand for a predetermined time; and
(e) obtaining a polyimide film from the precursor composition, wherein the ratio between the time required ($T_b$) in step (b), the time required ($T_c$) in step (c) and the allowing-to-stand time ($T_d$) in step (d) may be about 1.0 to about 1.5 (for example, about 1.0, about 1.1, about 1.2, about 1.3, about 1.4 or about 1.5):about 1.5 to about 2.5 (for example, about 1.5, about 1.6, about 1.7, about 1.8, about 1.9, about 2.0, about 2.1, about 2.2, about 2.3, about 2.4 or about 2.5):about 0.05 to about 0.15 (for example, about 0.05, about 0.06, about 0.07, about 0.08, about 0.09, about 0.10, about 0.11, about 0.12, about 0.13, about 0.14 or about 0.15).

When the above ratio is satisfied, the polyamic acid contained in the precursor composition may have a ratio of weight-average molecular weight to number-average molecular weight (polydispersity index (PDI)) of about 1.8 to about 3.0 (for example, about 1.8, about 1.9, about 2, about 2.1, about 2.2, about 2.3, about 2.4, about 2.5, about 2.6, about 2.7, about 2.8, about 2.9 or about 3.0), specifically about 1.8 to about 2.5, more specifically about 2.0 to about 2.5.

In general, the higher the 'PDI', the broader the molecular weight distribution (number average molecular weight and weight average molecular weight) of polymer chains having different molecular weights.

In this regard, a polyamic acid having a high PDI may contain relatively large amounts of polymer chains (e.g., polymer short-chains) having a relatively low molecular weight, for example, a molecular weight within about 1 to about 40% (e.g., about 1, about 10, about 20, about 30 or about 40%) from the bottom, and/or polymer chains (e.g., polymer long-chains) having a relatively high molecular weight, for example, a molecular weight within about 60% to about 100% (e.g., about 60, about 70, about 80, about 90 or about 100%) from the top, compared to conventional polyamic acid, and the molecular weight difference between the polymer long-chains and the polymer short-chains may also be relatively great.

When the PDI of the polyamic acid is within the range specified in the present disclosure, the polymer short-chains and the polymer long-chains may be distributed in the polyamic acid at an appropriate level.

As used herein, the term "appropriate level" may refer to a degree, level, state or phenomenon in which the polymer short-chains having a short chain length are advantageously located between the polymer long-chains having a long chain length.

As a number of states in which the polymer short-chains are located between the polymer long-chains as described above are present in the polyamic acid, the oriented structure of the polymer chains constituting the polyamic acid may be in a relatively dense form, and the polymer chains may be highly likely to be oriented side-by-side in a certain direction.

The polymer chains having the above-described dense form and oriented structure can form polyimide polymer chains that maintain their state even in a polyimide film produced by converting the amic acid group of the polyamic acid into an imide group.

In addition, a graphite sheet produced from this polyimide film may include a plurality of graphite layers produced by carbonization and graphitization of the polyimide polymer chains, and the graphite layer derived from the polyimide polymer chains having the above-described oriented structure may be positioned adjacent to other layers, thereby forming a graphite crystal structure that advantageously exhibits excellent thermal conductivity.

In summary, the polyamic acid prepared according to the production method of the present disclosure has a PDI within the range specified in the present disclosure, and thus the polymer chains thereof have a preferred oriented structure, and a polyimide film derived from the polyamic acid may have excellent orientation. In addition, a graphite sheet produced using the polyimide film may exhibit a high thermal conductivity of at least about 1,400 W/m·K, for example, at least about 1,400, about 1,410, about 1,420, about 1,430, about 1,440 or about 1,450 W/m·K, for another example, about 1,400 to 2,000 W/m·K, for another example, about 1,400 to 1,500 W/m·K, for another example, about 1,400 to 1,460 W/m·K, and for another example, about 1,400 to 1,450.6 W/m·K.

In other words, it can be understood that the polyamic acid including the polymer chains constituting the above-described preferred oriented structure is the most basic configuration for achieving the high thermal conductivity of the graphite sheet, and is in an important position.

As will be clearly demonstrated below, it is presumed that the production method according to the present disclosure may provide the polyamic acid having the above-described characteristics, as the ratio of $T_b:T_c:T_d$ is optimal and a combination of optimized process conditions, for example, the number of additions of the second monomer, the time interval between the additions of the second monomer, and the allowing-to-stand time, acts in steps (b), (c) and (d), which will be described in detail below.

In the present disclosure, step (b) and step (c) may be distinguished from each other with respect to the time when the second monomer is first added in step (c).

Accordingly, the time required ($T_b$) in step (b) may refer to a time period from the time when the second monomer is first added to the time when the second monomer is first introduced in step (c). In addition, the allowing-to-stand time in step (b) refers to a time period from the time when the last addition of the second monomer in step (b) is completed to the time when the second monomer is first added in the step (c). In addition, the allowing-to-stand in step (b) may be regarded as being completed and terminated at the time when the second monomer is first added in step (c).

The time required ($T_c$) in step (c) may refer to a time period from the time when the second monomer is first added in step (c) to the time when the second monomer is finally added in step (c) and addition of the second monomer is completely terminated.

At this time, the time when the second monomer is completely terminated means that the second monomer is not substantially added, but when the first monomer and the second monomer are substantially equimolar, addition of the second monomer may be terminated.

In step (c), "adding the second monomer so that the first and second monomers are substantially equimolar" may mean that the second monomer is added in an amount of about 99.8 mol % to about 100.2 mol % (for example, about 99.8, about 99.9, about 100, about 100.1 or about 100.2 mol %) relative to the total moles of the first monomer. The amount of second monomer added may be about 1.2 mol % to about 7.2 mol % (for example, about 1.2, about 1.4, about 1.6, about 1.8, about 2, about 2.2, about 2.4, about 2.6, about 2.8, about 3, about 3.2, about 3.4, about 3.6, about 3.8, about 4, about 4.2, about 4.4, about 4.6, about 4.8, about 5, about 5.2, about 5.4, about 5.6, about 5.8, about 6, about 6.2, about 6.4, about 6.6, about 6.8, about 7 or about 7.2 mol %), specifically about 3 mol % to about 5 mol %, relative to the total moles of the first monomer.

The allowing-to-stand time ($T_d$) in step (d) may refer to a time period from the time when addition of the second monomer in (c) step is completely terminated to the time when a predetermined time has elapsed.

Meanwhile, in order to produce the polyamic acid having an oriented structure in which polymer chains are packed densely and oriented as described above, it is necessary to control the reaction time between the first monomer and the second monomer to an appropriate level.

In general, in the production of a polyamic acid, as the monomer reaction time increases, a reaction in which at least a portion of the polymer chains is extended may be continuously induced. As a result, a large number of polymer long-chains may be produced, whereas the formation of polymer short-chains may be insignificant. In addition, as the monomer reaction time increases, the PDI may decrease, that is, the molecular weight distribution may tend to decrease.

On the contrary, as the monomer reaction time decreases, a large number of polymer short-chains may be produced and form a significant portion of the molecular weight distribution of the polyamic acid. This may lead to a decrease in the physical properties of the polyimide film to be produced afterwards and a decrease in the thermal conductivity of the graphite sheet, as well as a rapid increase in the PDI.

Accordingly, the present disclosure provides a method of controlling the reaction time between the first monomer and the second monomer to an appropriate level through the following non-limiting examples.

In a specific example, in step (b), the second monomer may be added at least once, specifically about three times, at intervals of about 5 minutes to about 20 minutes (for example, about 5, about 5.5, about 6, about 6.5, about 7, about 7.5, about 8, about 8.5, about 9, about 9.5, about 10, about 10.5, about 11, about 11.5, about 12, about 12.5, about 13, about 13.5, about 14, about 14.5, about 15, about 15.5, about 16, about 16.5, about 17, about 17.5, about 18, about 18.5, about 19, about 19.5 or about 20 minutes), specifically about 8 minutes to about 12 minutes, and in step (c), the second monomer may be added in portions at least about 3 times, specifically at least about 5 times, at intervals of about 15 minutes to about 25 minutes (for example, about 15, about 15.5, about 16, about 16.5, about 17, about 17.5, about 18, about 18.5, about 19, about 19.5, about 20, about 20.5, about 21, about 21.5, about 22, about 22.5, about 23, about 23.5, about 24, about 24.5 or about 25 minutes), specifically about 18 minutes to about 22 minutes.

In a more preferred example, in step (b), the second monomer may be added in portions at least about 3 times at intervals of about 9.5 minutes to about 10.5 minutes, and in step (c), the second monomer may be added in portions at least about 5 times at intervals of about 19.5 minutes to about 20.5 minutes.

In the step (b), the reaction between the first monomer and the second monomer may be gradually induced by adding the second monomer in portions at least about 3 times.

In addition, the additions in portions of the second monomer in step (b) may advantageously act to produce polymer long-chains and polymer short-chains in suitable amounts.

In addition, in step (b), adding the second monomer in portions at time intervals within a predetermined range may advantageously act to ensure that the formed polymer chains are densely packed by interaction and oriented at a desired level.

In particular, the total time required to add the second monomer in step (b) may be an optimal time for the polymer produced in this step to have an appropriate level of PDI.

Allowing to stand for a predetermined time in step (b) may positively induce unreacted first and second monomers that may exist in this process to slowly react to additionally produce polymer short-chains, and induce polymer chains in a relatively fluid state to be densely packed together by interaction and oriented.

This allowing-to-stand process may lead to an advantageous result that the packed and oriented state of polymer chains is stably maintained even in the subsequent step.

In the present disclosure, the term "interaction" may refer to the interaction between polymer chains. Specifically, it may refer to at least one of a phenomenon and a state in which the electron donor and electron acceptor present in the polymer chain form a charge transfer force with those of other polymer chains, so that different polymer chains are oriented adjacent to one another. Allowing-to-stand in step (b) may be helpful for this interaction.

In another aspect, the polymer short-chains produced at a desirable level through step (b) may play a major role in improving the orientation of a polyimide film that is obtained later. Specifically, the polymer short-chains may be considered having a higher degree of freedom of movement than the polymer long-chains. Thus, for example, when stretching is performed in the step of obtaining a polyimide film from the precursor composition, the polymer short-chains may be oriented at a desired level while moving easily, with an advantageous result that a polyimide film to be obtained later has good orientation.

For the implementation of the foregoing, the allowing-to-stand in step (b) may be performed for about 15 minutes to about 25 minutes (for example, about 15, about 15.5, about 16, about 16.5, about 17, about 17.5, about 18, about 18.5, about 19, about 19.5, about 20, about 20.5, about 21, about 21.5, about 22, about 22.5, about 23, about 23.5, about 24, about 24.5 or about 25 minutes), specifically about 18 minutes to about 22 minutes, more specifically about 19 minutes to about 21 minutes. Particularly, the allowing-to-stand may preferably be performed for about 20 minutes.

Allowing to stand for a time outside the above-described range has a problem in that the level at which the polymer chains are densely packed and oriented is not a desired level, or the additional production of polymer short-chains is only insignificant. Thus, this is not preferable in terms of difficulty in achieving the intended effect of the present disclosure.

Where the second monomer is added in portions in step (c), the lengths of the polymer chains constituting the polymer produced in step (b) may be extended, and on the other hand, unreacted first monomer and second monomer may react gradually, leading to the additional production of polymer short-chains.

Similarly to those in step (b), the polymer short-chains produced at a desirable level through step (c) may play a major role in improving the orientation of a polyimide film to be obtained later.

It is noticeable that, in step (c), the second monomer is added in portions multiple times for a longer time than in step (b). That is, adding a smaller amount of the second monomer for a relatively long time may induce polymer short-chains to be further produced and may play a major role in allowing a polyamic acid to be obtained later to have a predetermined PDI. Therefore, by securing a relatively long time for the polymer chains to interact, the polymer chains in the production process and/or the polymer chains produced may be densely packed between the polymer chains of the polymer produced in the previous step (b) and may be oriented at a desired level.

However, if the time required in step (c) is shorter than the lower limit of the range specified in the present disclosure, problems arise in that an excessive amount of unreacted second monomer may be present after completion of step (c), and a sufficient interaction between the polymer chains may not be achieved, and thus it is difficult to achieve the preferred orientation structure intended in the present disclosure.

On the other hand, if the time required in the step (c) is longer than the upper limit of the range specified in the present disclosure, undesirable side reactions other than the reaction involved in the formation of the polymer chains may undesirably occur.

In summary, in order for the polymer chains to have the above-described oriented structure while allowing the polyamic acid to have an appropriate level of PDI, it is important that steps (b) and (c) that are continuously performed achieve a process balance related to the monomer reaction and the interaction between the polymer chains. Accordingly, the present disclosure has described a preferred ratio between the time required ($T_b$) in step (b) and the time required ($T_c$) in step (c), as described above.

However, as described above, even though step (c) is completed, the oriented structure of the polymer chains may not be achieved at a desired level. This is because a portion of the second monomer may remain unreacted after the completion of step (c), and thus the packed and oriented state of the entire polymer chains produced is unstable.

Therefore, the production method according to the present disclosure includes step (d) of allowing the polymer produced in step (c) to stand for a predetermined time. Through the step (d), the remaining second monomer may be sufficiently reacted, and the time for the polymer chains to interact may be ensured, so that the oriented structure of the entire polymer chains may be stably maintained.

Therefore, step (d) is closely related to step (c), and thus it is important that these steps achieve a process balance related to the monomer reaction and the interaction between the polymer chains. Accordingly, the present disclosure has described a preferred ratio between the time required ($T_c$) in step (c) and the time required ($T_d$) in step (d), as described above.

The allowing-to-stand in step (d) may be performed for about 3 minutes to about 7 minutes (for example, about 3, about 3.5, about 4, about 4.5, about 5, about 5.5, about 6, about 6.5 or about 7 minutes), specifically about 4 minutes to about 6 minutes, more specifically about 5 minutes.

If the allowing-to-stand time is shorter than the lower limit of the above range, it may be difficult to expect the above-described effects, and if the allowing-to-stand time is longer than the upper limit of the above range, it may be advantageous in terms of the dense packing of the polymer chains, but the polymer chains present in a relatively fluid state for a long time of allowing-to-stand may be entangled and the orientation of a polyimide film to be obtained later may be deteriorated.

In the present disclosure, the first monomer may be at least one diamine component, and the second monomer may be at least one dianhydride component.

Alternatively, the first monomer may be at least one dianhydride component, and the second monomer may be at least one diamine component.

In this case, the second monomer added in portions in step (b) and the second monomer added in portions in step (c) may be the same component or different components.

The diamine component is an aromatic diamine, and examples thereof may be classified as follows:

1) relatively rigid diamines having one benzene ring in the structure thereof, such as 1,4-diaminobenzene(paraphenylenediamine (PDA, PPD), 1,3-diaminobenzene, 2,4-diaminotoluene, 2,6-diaminotoluene, and 3,5-diaminobenzoic acid (DABA);

2) diamines having two benzene rings in the structure thereof, such as diaminodiphenyl ethers, such as 4,4'-diaminodiphenyl ether (or oxydianiline (ODA)) or 3,4'-diaminodiphenyl ether, 4,4'-diaminodiphenylmethane (4,4'-methylenedianiline (MDA)), 3,3'-dimethyl-4,4'-diaminobiphenyl, 2,2'-dimethyl-4,4'-diaminobiphenyl, 2,2'-bis(trifluoromethyl)-4,4'-diaminobiphenyl, 3,3'-dimethyl-4,4'-diaminodiphenylmethane, 3,3'-dicarboxy-4,4'-diaminodiphenylmethane, 3,3',5,5'-tetramethyl-4,4'-diaminodiphenylmethane, bis(4-aminophenyl) sulfide, 4,4'-diaminobenzanilide, 3,3'-dimethylbenzidine (or o-tolidine), 2,2'-dimethylbenzidine (or m-tolidine), 3,3'-dimethoxybenzidine, 2,2'-dimethoxybenzidine, 3,3'-diaminodiphenyl ether, 3,4'-diaminodiphenyl ether, 4,4'-diaminodiphenyl ether, 3,3'-diaminodiphenyl sulfide, 3,4'-diaminodiphenylsulfide, 4,4'-diaminodiphenylsulfide, 3,3'-diaminodiphenylsulfone, 3,4'-diaminodiphenylsulfone, 4,4'-diaminodiphenylsulfone, 3,3'-diaminobenzophenone, 4,4'-diaminobenzophenone, 3,3'-diamino-4,4'-dichlorobenzophenone, 3,3'-diamino-4,4'-dimethoxybenzophenone, 3,3'-diaminodiphenylmethane, 3,4'-diaminodiphenylmethane, 4,4'-diaminodiphenylmethane, 2,2-bis(3-aminophenyl)propane, 2,2-bis(4-aminophenyl)propane, 2,2-bis(3-aminophenyl)-1,1,1,3,3,3-hexafluoropropane, 2,2-bis(4-aminophenyl)-1,1,1,3,3,3-hexafluoropropane, 3,3'-diaminodiphenylsulfoxide, 3,4'-diaminodiphenylsulfoxide, and 4,4'-diaminodiphenylsulfoxide;

3) diamines having three benzene rings in the structure thereof, such as 1,3-bis(3-aminophenyl)benzene, 1,3-bis(4-aminophenyl)benzene, 1,4-bis(3-aminophenyl)benzene, 1,4-bis(4-aminophenyl)benzene, 1,3-bis(4-aminophenoxy)benzene (TPE-R), 1,4-bis(3-aminophenoxy)benzene (TPE-Q), 1,3-bis(3-aminophenoxy)-4-trifluoromethylbenzene, 3,3'-diamino-4-(4-phenyl)phenoxybenzophenone, 3,3'-diamino-4,4'-di(4-phenylphenoxy)benzophenone, 1,3-bis(3-aminophenylsulfide)benzene, 1,3-bis(4-aminophenylsulfide)benzene, 1,4-bis(4-aminophenylsulfide)benzene, 1,3-bis(3-aminophenylsulfone)benzene, 1,3-bis(4-aminophenylsulfone)benzene, 1,4-bis(4-aminophenylsulfone)benzene, 1,3-bis[2-(4-aminophenyl)isopropyl]benzene, 1,4-bis[2-(3-aminophenyl)isopropyl]benzene, and 1,4-bis(2-(4-aminophenyl) isopropyl)benzene; and 4) diamines having four benzene rings in the structure thereof, such as 3,3'-bis(3-aminophenoxy)biphenyl, 3,3'-bis(4-aminophenoxy)biphenyl, 4,4'-bis(3-aminophenoxy)biphenyl, 4,4'-bis(4-aminophenoxy)biphenyl, bis[3-(3-aminophenoxy)phenyl]ether, bis[3-(4-aminophenoxy)phenyl]ether, bis[4-(3-aminophenoxy)phenyl] ether, bis[4-(4-aminophenoxy)phenyl]ether, bis[3-(3-aminophenoxy)phenyl]ketone, bis[3-(4-aminophenoxy)phenyl]ketone, bis[4-(3-aminophenoxy)phenyl]ketone, bis(4-(4-aminophenoxy)phenyl]ketone, bis(3-(3-aminophenoxy)phenyl) sulfide, bis(3-(4-aminophenoxy)phenyl]sulfide, bis[4-(3-aminophenoxy)phenyl]sulfide, bis[4-(4-aminophenoxy)phenyl]sulfide, bis[3-(3-aminophenoxy)phenyl]sulfone, bis[3-(4-aminophenoxy)phenyl]sulfone, bis[4-(3-aminophenoxy)phenyl]sulfone, bis[4-(4-aminophenoxy)phenyl]sulfone, bis[3-(3-aminophenoxy)phenyl]methane, bis[3-(4-aminophenoxy)phenyl]methane, bis[4-(3-aminophenoxy)phenyl]methane, bis[4-(4-aminophenoxy)phenyl]methane, 2,2-bis[3-(3-aminophenoxy)phenyl]propane, 2,2-bis[3-(4-aminophenoxy)phenyl]propane, 2,2-bis[4-(3-aminophenoxy)phenyl]propane, 2,2-bis[4-(4-aminophenoxy)phenyl]propane (BAPP), 2,2-bis[3-(3-aminophenoxy)phenyl]-1,1,1,3,3,3-hexafluoropropane, 2,2-bis[3-(4-aminophenoxy)phenyl]-1,1,1,3,3,3-hexafluoropropane, 2,2-bis[4-(3-aminophenoxy)phenyl]-1,1,1,3,3,3-hexafluoropropane, and 2,2-bis(4-(4-aminophenoxy)phenyl)-1,1,1,3,3,3-hexafluoropropane.

These diamines may be used alone or in combination of two or more as desired.

The dianhydride component may be an aromatic tetracarboxylic dianhydride.

Examples of the aromatic tetracarboxylic dianhydride include pyromellitic dianhydride (PMDA), 3,3',4,4'-biphenyltetracarboxylic dianhydride (s-BPDA), 2,3,3',4'-biphenyltetracarboxylic dianhydride (a-BPDA), oxydiphthalic dianhydride (ODPA), diphenylsulfone-3,4,3',4'-tetracarboxylic dianhydride (DSDA), bis(3,4-dicarboxyphenyl) sulfide dianhydride, 2,2-bis(3,4-dicarboxyphenyl)-1,1,1,3,3,3-hexafluoropropane dianhydride, 2,3,3',4'-benzophenonetetracarboxylic dianhydride, 3,3',4,4'-benzophenonetetracarboxylic dianhydride (BTDA), bis(3,4-dicarboxyphenyl) methane dianhydride, 2,2-bis(3,4-dicarboxyphenyl)propane dianhydride, p-phenylenebis(trimellitic monoester acid anhydride), p-biphenylenebis(trimellitic monoester acid anhydride), m-terphenyl-3,4,3',4'-tetracarboxylic dianhydride, p-terphenyl-3,4,3',4'-tetracarboxylic dianhydride, 1,3-bis(3,4-dicarboxyphenoxy)benzene dianhydride, 1,4-bis(3,4-dicarboxyphenoxy)benzene dianhydride, 1,4-bis(3,4-dicarboxyphenoxy)biphenyl dianhydride, 2,2-bis[(3,4-dicarboxyphenoxy)phenyl]propane dianhydride (BPADA), 2,3,6,7-naphthalenetetracarboxylic acid dianhydride, 1,4,5,8-naphthalenetetracarboxylic acid dianhydride, and 4,4'-(2,2-hexafluoroisopropylidene)diphthalic acid dianhydride. These may be used alone or in combination of two or more as desired.

An organic solvent that may be used in the production method of the present disclosure is not particularly limited as long as it is a solvent capable of dissolving the polyamic acid. In one example, the organic solvent may be an aprotic polar solvent.

Non-limiting examples of the aprotic polar solvent include amide-based solvents such as N,N'-dimethylformamide (DMF) or N,N'-dimethylacetamide (DMAc), phenolic solvents such as p-chlorophenol or o-chlorophenol, N-methyl-pyrrolidone (NMP), gamma-butyrolactone (GBL), and Diglyme. These may be used alone or in combination of two or more.

In some cases, the solubility of the polyamic acid may also be adjusted using a co-solvent such as toluene, tetrahydrofuran, acetone, methyl ethyl ketone, methanol, ethanol, or water.

In one example, organic solvents that may be particularly preferably used in the production of the precursor composition of the present disclosure may be N,N'-dimethylformamide and N,N'-dimethylacetamide, which are amide-based solvents.

The precursor composition obtained through step (d) may contain a filler for the purpose of improving various properties such as sliding properties, thermal conductivity, conductivity, corona resistance and loop hardness of the polyimide film and the graphite sheet produced from the polyimide film, as well as processing properties. The filler may be added in step (d).

The filler is not particularly limited, but a preferred example thereof may be at least one selected from the group consisting of silica, titanium oxide, alumina, silicon nitride, boron nitride, calcium hydrogen phosphate, dicalcium phosphate, barium sulfate, calcium carbonate, and mica.

The precursor composition obtained through step (d) may further contain a dehydrating agent and/or an imidizing agent.

When step (e) is performed, the dehydrating agent and/or the imidizing agent may help to rapidly convert the polyamic acid in the precursor composition into a polyimide.

As used herein, the term "dehydrating agent" refers to a substance that promotes a ring closure reaction through a dehydration action on the polyamic acid. Non-limiting examples of the dehydrating agent include aliphatic acid anhydrides, aromatic acid anhydrides, N,N'-dialkylcarbodiimide, halogenated lower aliphatic halides, halogenated lower fatty acid anhydrides, aryl phosphonic dihalides, and thionyl halides. Among them, an aliphatic acid anhydride may be preferable from the viewpoint of ease of availability and cost, and non-limiting examples thereof include acetic anhydride (AA), propionic acid anhydride, and lactic acid anhydride. These may be used alone or in combination of two or more.

As used herein, the term "imidizing agent" refers to a substance having the effect of promoting the ring closure reaction on the polyamic acid. Examples of the imidizing agent include imine-based components such as aliphatic tertiary amines, aromatic tertiary amines, and heterocyclic tertiary amines. Among them, a heterocyclic tertiary amine may be preferable from the viewpoint of reactivity as a catalyst. Non-limiting examples of the heterocyclic tertiary amine include quinoline, isoquinoline, β-picoline (BP), and pyridine. These may be used alone or in combination of two or more.

The amount of dehydrating agent added is preferably in the range of about 0.5 to about 5 moles (e.g., about 0.5, about 1, about 2, about 3, about 4 or about 5 moles), particularly preferably in the range of about 1.0 mole to about 4 moles, per mole of the amic acid group in the polyamic acid. In addition, the amount of imidizing agent added is preferably in the range of about 0.05 moles to about 2 moles (e.g., about 0.05, about 0.1, about 0.2, about 0.3, about 0.4, about 0.5, about 0.6, about 0.7, about 0.8, about 0.9, about 1, about 1.1, about 1.2, about 1.3, about 1.4, about 1.5, about 1.6, about 1.7, about 1.8, about 1.9 or about 2 moles), particularly preferably in the range of about 0.2 moles to about 1 mole, per mole of the amic acid group in the polyamic acid.

If the amounts of dehydrating agent and the imidizing agent added are smaller than the lower limits of the above ranges, chemical imidization may be insufficient, cracks may be formed in the polyimide film produced, and the mechanical strength of the film may also be degraded. In addition, if these amounts added are larger than the upper limits of the above ranges, imidization may proceed excessively rapidly, and in this case, casting into a film form may be difficult or the produced polyimide film may undesirably exhibit brittle characteristics.

As described above, the precursor composition prepared through steps (a) to (d) may contain polyamic acid solids in an amount of about 10 to about 25 wt % (e.g., about 10, about 11, about 12, about 13, about 14, about 15, about 16, about 17, about 18, about 19, about 20, about 21, about 22, about 23, about 24 or about 25 wt %), specifically about 13 to about 20 wt %, particularly specifically about 13 to about 15 wt %, based on the total weight of the composition.

If the content of the polyamic acid solids is higher than the upper limit of the above range, a graphite sheet produced using a polyimide film produced therefrom may not exhibit a desired thermal conductivity.

This is believed to be because if the precursor composition contains a large amount of polyamic acid solids, the polymer chains are entangled and the orientation of the polyimide film to be obtained later is impaired, and the graphite sheet produced therefrom exhibits reduced thermal conductivity due to an irregular graphite layer.

If the content of the polyamic acid solids is lower than the lower limit of the above range, the viscosity of the precursor composition may be excessively low, and a film-forming process for producing the polyimide film may not proceed smoothly, which is not preferable.

Meanwhile, according to the present disclosure, it is possible to obtain a polyimide film having excellent orientation using the precursor composition containing the polyamic acid produced as described above. Hereinafter, step (e) of obtaining the polyimide film will be described in detail.

In one specific example, step (e) may include steps of:
producing a film intermediate by casting the precursor composition into a film on a support, followed by drying at a temperature lower than about 110° C.;
stretching the film intermediate in a machine direction (MD); and
obtaining a polyimide film by heat-treating the stretched film intermediate in a variable temperature range of about 20° C. to about 700° C. in a state in which both ends of the stretched film intermediate are fixed in a transverse direction (TD) with respect to the MD.

As used herein, the term "film intermediate" may be understood as an intermediate form having a self-supporting property in an intermediate step with respect to the conversion of the polyamic acid into a polyimide.

In the step of producing the film intermediate, the film intermediate may be produced by casting the precursor composition in a film form on a support such as a glass plate, aluminum foil, endless stainless belt or stainless drum, and then drying the precursor composition on the support at a temperature lower than about 110° C. (e.g., lower than about 60, about 70, about 80, about 90, about 100° C. or about 110° C.), specifically about 60° C. to lower than about 110° C., more specifically a constant or variable temperature selected from the range of about 60° C. to about 100° C., even more specifically about 60° C. to about 90° C. Accordingly, the film intermediate may be formed by partial curing and/or drying of the precursor composition, and then the film intermediate may be obtained by peeling from the support.

In some cases, the step of producing the film intermediate may further include the step of allowing the dried film intermediate to stand at room temperature.

It is noted that the step of producing the film intermediate is performed at a relatively low temperature between about 60° C. and lower than about 110° C.

Typically, in a conventional process of producing a polyimide film, a film intermediate is formed in a temperature range of about 120° C. to about 150° C. If the film intermediate is formed at such a relatively high temperature, the organic solvent contained in the precursor composition may be rapidly volatilized, and the organic solvent rapidly volatilized and vaporized in this way may cause alteration or modification into an undesirable oriented structure by disturbing the oriented structure of the polymer chains relatively regularly packed through the preceding steps (a) to (d) and oriented in a certain direction. This is believed to be because the polymer chains are present in a relatively fluid state in the step of producing the film intermediate.

In addition, since the precursor composition is dried relatively quickly, the fluidity of the polymer chains may be quickly lost. This may block the phenomenon in which the polymer chains are densely packed and/or oriented again by the interaction, with the result that the film intermediate and the polyimide film to be produced later have poor orientation.

Here, the polymer chains may be polyamic acid polymer chains and/or polyimide polymer chains.

On the other hand, in the present disclosure, it is possible to minimize the alteration or modification of the oriented structure of the polymer chains by drying the film intermediate at a relatively low temperature lower than about 110° C. so that the organic solvent is slowly volatilized.

In another aspect, drying the precursor composition in the above-described temperature range is also preferable in that, as the drying proceeds at a relatively slow speed, the disordered polymer chains may be densely packed again and oriented in a certain direction, so that the preferred oriented structure intended in the present disclosure may be formed again.

The film intermediate produced as described above may be transferred to a tenter and then transferred to a heat treatment apparatus. In this process, the film intermediate may be stretched, so that the orientation of the polymer chains may be improved.

For reference, the drying temperature for forming the film intermediate may be appropriately adjusted within the range specified in the present disclosure depending on the weight of the precursor composition.

For example, in the case of a precursor composition containing a relatively small amount of a polyamic acid produced using a small-scale reactor having a capacity of about 10 liters or less, a more preferable drying temperature range may be about 60° C. to about 80° C. On the other hand, in the case of a precursor composition containing a relatively large amount of a polyamic acid produced using a relatively large-scale reactor having a capacity of about 100 liters or more, the drying temperature is more preferably selected from the range of about 80° C. to lower than about 110° C.

In one specific example, the film intermediate may be stretched in the MD at an elongation rate of about 110% to about 180% (e.g., about 110, about 120, about 130, about 140, about 150, about 160, about 170 or about 180%), specifically about 120% to about 170%, particularly specifically about 130% to about 160%.

The elongation rate may be adjusted by, for example, a difference in speed between a plurality of transfer rollers included in the tenter.

If the elongation rate is higher than the upper limit of the above range, the thickness of the film intermediate may undesirably be excessively thin or the film intermediate may undesirably be broken. This may occur when the speed of the transfer rollers is excessively fast or when the difference in speed between different transfer rollers is excessively great. Thus, in order to achieve the elongation rate limited in the present disclosure, it is required to appropriately adjust the speed of the transfer rollers.

In addition, if the elongation rate is lower than the lower limit of the above range, it is undesirably difficult to achieve orientation at a desired level. This may occur even when the speed of the transfer rollers is excessively slow or when the difference in speed between different transfer rollers is excessively small.

Meanwhile, according to steps (a) to (d) of the production method of the present disclosure, it is possible to obtain a polyamic acid having an oriented structure in which polymer chains are densely packed and oriented in a certain direction. Using the polyamic acid, a film intermediate in which the oriented structure is preferably maintained may be produced in step (e) which is a relatively low temperature environment. In addition, a film intermediate with improved orientation of polymer chains may be produced through stretching in the MD.

According to the present disclosure, a polyimide film having a more improved orientation while maintaining the oriented structure at a desirable degree may be produced by performing a heat-treatment process on the film intermediate produced as described above.

In one embodiment, the heat treatment may include:
a first heat-treatment process of raising the temperature from about 20° C. to about 400° C.;
a second heat-treatment process of raising the temperature from about 400° C. to about 650° C.;
wherein the first heat-treatment process may be performed at any one or more temperature rise rates selected from the range of higher than about 110° C./min to about 500° C./min (e.g., higher than about 110° C./min, or about 120, about 130, about 140, about 150, about 160, about 170, about 180, about 190, about 200, about 210, about 220, about 230, about 240, about 250, about 260, about 270, about 280, about 290, about 300, about 310, about 320, about 330, about 340, about 350, about 360, about 370, about 380, about 390, about 400, about 410, about 420, about 430, about 440, about 450, about 460, about 470, about 480, about 490 or about 500° C./min), and
the second heat-treatment process may be performed at any one or more temperature rise rates selected from the range of about 50° C./min to about 110° C./min, for example, about 50, about 60, about 70, about 80, about 90, about 100 or about 110° C./min, and for another example, the range of about 50° C./min to about 100° C./min.

The first heat-treatment may be performed at a relatively high temperature rise rate. Specifically, imidization of the polyamic acid may be rapidly performed at any one or more temperature rise rates selected from the range of about 200° C./min to about 400° C./min, more specifically about 250° C./min to about 350° C./min, even more specifically about 300° C./min to about 350° C./min.

The temperature rise rate range in the first heat-treatment may act optimally to promote imidization of the polyamic acid to a desirable degree so that the oriented structure of polymer chains intended in the present disclosure is included in a polyimide film which is a final product.

Specifically, the first heat-treatment allows the oriented structure of polymer chains of the polyamic acid formed in the previous step to be maintained until a polyimide film is reached, by inducing imidization of the polyamic acid for a relatively short time in a state in which the oriented structure of polymer chains intended in the present disclosure has been relatively stabilized through the step of producing the film intermediate.

However, if the temperature rise rate in the first heat-treatment is excessively high, deformation or shrinkage of the polyimide film may occur, and in this case, it may be difficult to obtain a polyimide in a film form, and even though a polyimide film is obtained, the obtained polyimide film may have poor orientation.

Accordingly, in the step of obtaining the polyimide film according to the present disclosure, the stretched film intermediate may be fixed at both ends thereof in the transverse direction (TD) with respect to the MD, and then heat-treated in a non-stretched state with respect to the TD.

Thereby, it is possible to minimize deformation of the obtained polyimide film, as well as to suppress a phenomenon in which the oriented polymer chains move during the heat-treatment process.

The temperature rise rate may be determined by measuring the temperature change of the film intermediate itself or by measuring the change of the ambient temperature in the tenter and calculating the temperature change of the film intermediate based on the heat transfer theory.

Polyimide Film

A polyimide film of the present disclosure is characterized in that it is produced by the 'method for producing a polyimide film' described above.

The polyimide film of the present disclosure may have a molecular orientation ratio (MOR) of about 1.25 or more (for example, about 1.25, about 1.26, about 1.27, about 1.28, about 1.29, about 1.30, about 1.31 or about 1.32 or more, and for another example, about 1.25 to about 1.50, and for another example, about 1.25 to about 1.40, and for another example, about 1.25 to about 1.32).

The term "molecular orientation ratio" may be understood as an index that may quantitatively indicate the degree of orientation of polymer chains constituting the polymer. When the molecular orientation ratio of the polyimide film is about 1.25 or more, a graphite sheet produced using the polyimide film may exhibit excellent thermal conductivity.

The polyimide film of the present disclosure may have a thickness of about 15 μm to about 200 μm (for example, about 15, about 20, about 25, about 30, about 35, about 40, about 45, about 50, about 55, about 60, about 65, about 70, about 75, about 80, about 85, about 90, about 95, about 100, about 105, about 110, about 115, about 120, about 125, about 130, about 135, about 140, about 145, about 150, about 155, about 160, about 165, about 170, about 175, about 180, about 185, about 190, about 195, about 200 μm), specifically about 20 μm to about 125 μm, particularly specifically about 20 μm to about 100 μm.

Graphite Sheet

A graphite sheet of the present disclosure may be produced using the polyimide film produced by the 'method for producing a polyimide film' described above. Specifically, the graphite sheet may be produced by carbonizing and/or graphitizing the polyimide film.

The carbonization step may be performed using a hot press and/or an electric furnace under reduced pressure or nitrogen gas. In the present disclosure, the carbonization may be performed at a temperature of about 800° C. to about 1,500° C. (for example, about 800, about 900, about 1,000, about 1,100, about 1,200, about 1,300, about 1,400 or about 1,500° C.) for about 1 hour to about 20 hours (for example, about 1, about 2, about 3, about 4, about 5, about 6, about 7, about 8, about 9, about 10, about 11, about 12, about 13, about 14, about 15, about 16, about 17, about 18, about 19 or about 20 hours).

In some cases, pressure may be applied in a vertical direction using a hot press for carbon orientation in a desired form. In this case, a pressure of about 0.1 kg/cm$^2$ or more, about 1 kg/cm$^2$ or more, or about 5 kg/cm$^2$ or more may be applied during the carbonization process. However, this is an example for helping to carry out the present disclosure, and the scope of the present invention is not limited to the above pressure condition.

Subsequently thereto, a step of graphitizing the carbonized polyimide film may be performed. However, as an intermediate step, a step of heat-treating the carbonized polyimide film by heating it from a temperature of about 1,000° C. or higher to a temperature of about 2,500° C. required for the graphitization step in a hot press and/or an electric furnace may be included.

The graphitization step may also be performed using a hot press and/or an electric furnace. The graphitization step may also be performed in an inert gas. Preferred examples of the inert gas include a mixed gas containing argon and a small amount of helium.

The heat-treatment temperature in the graphitization step is required to be about 2,500° C. or higher, and is preferably about 3,000° C. or lower in consideration of economy. For example, the heat-treatment temperature in the graphitization step may be, but is not limited to, about 2,500° C. to about 3,000° C. (for example, about 2,500, about 2,600, about 2,700, about 2,800, about 2,900 or about 3,000° C.), and for another example, about 2,600° C. to about 3,000° C., and for another example, about 2,700° C. to about 2,900° C.

In some cases, a pressure of about 100 kg/cm$^2$ or more, specifically about 200 kg/cm$^2$ or more, more specifically about 300 kg/cm$^2$ or more may be applied in the graphitization step. However, this is an example for helping to carry out the present disclosure, and the scope of the present disclosure is not limited to the above pressure condition.

The graphite sheet produced as described above may have a thermal conductivity of about 1,400 W/m·K or higher.

Advantageous Effects

According to the method for producing a polyimide film according to the present disclosure, a polyamic acid having an oriented structure in which polymer chains are densely packed and oriented in a certain direction may be obtained through steps (a) to (d).

In addition, according to the present disclosure, a film intermediate in which the oriented structure is maintained to a desirable degree may be produced by drying a precursor composition containing the produced polyamic acid at a relatively low temperature through step (e). Moreover, according to the production method of the present disclosure, additional improvement in the orientation of the polymer chains may be induced by stretching the film intermediate in the machine direction (MD).

The film intermediate produced as described above may be converted into a polyimide film having further improved orientation while the above-described oriented structure is maintained to a desirable degree by the heat-treatment process according to one aspect of the production method of the present invention.

The polyimide film produced according to this production method has a molecular orientation ratio of about 1.25 or more, and thus has excellent orientation.

Therefore, the graphite sheet produced using the polyimide film according to the present disclosure may exhibit an excellent thermal conductivity of about 1,400 W/m·K or more.

BEST MODE

Hereinafter, the operation and effect of the present disclosure will be described in more detail with reference to specific examples of the present disclosure. However, these examples serve merely to illustrate the present disclosure, and the scope of the present disclosure is not determined thereby.

Example 1

Step (a) of the production method according to the present disclosure was performed as follows:
  200 kg of DMF was placed in a 300-liter reactor and set to a temperature of 20° C. Next, 20.3 kg of 4,4-ODA as a first monomer (diamine) was added thereto and dissolved therein.

Then, step (b) of the production method according to the present disclosure was performed as follows:
  PMDA as a second monomer (dianhydride) was added in portions three times. The PMDA was added three times in amounts of 7.15 kg, 7.15 kg and 7.15 kg, respectively, and the additions were performed continuously at intervals of about 10 minutes. The reactor was allowed to stand for a time period from the time when the last addition was completed to the time when about 20 minutes had elapsed. At this time, the amount of second monomer added was about 97 mol % relative to the total moles of the first monomer.

Subsequently, step (c) of the production method according to the present disclosure was performed as follows:
  PMDA as the second monomer (dianhydride) was added in portions five times. At the time of addition of the first portion, the allowing-to-stand of step (b) was completed. The PMDA was added sequentially in amounts of 150 g, 150 g, 150 g, 150 g and 60 g, and the additions were performed continuously at intervals of about 20 minutes. At this time, the amount of second monomer added was about 99.8 mol % relative to the total moles of the first monomer.

Then, step (d) of the production method according to the present disclosure was performed as follows:
  The reactor was allowed to stand for a time period from the time when the last addition of the second monomer in step (c) was completed to the time when about 4 minutes had elapsed. Then, a precursor composition containing 15 wt % of polyamic acid solids was recovered from the reactor. Then, 7 kg of beta-picoline as an imidizing agent and 48.5 kg of acetic anhydride as a dehydrating agent were added to the precursor composition, thus preparing a final precursor composition (a film-forming composition).

At this time, the ratio between the time required ($T_b$) in step (b), the time required ($T_c$) in step (c) and the allowing-to-stand time ($T_d$) in step (d) was 1:2:0.1.

Then, step (e) of the production method according to the present disclosure was performed as follows:
  (e-1) A film intermediate was produced by applying the precursor composition to an endless stainless plate in a dryer and drying the applied precursor composition at a temperature of about 90° C.
  (e-2) The produced film intermediate was placed in a tenter, and then stretched at about 130% in the machine direction (MD) by adjusting the speed of transfer rollers while being transferred to a heat-treatment device (including a plurality of zones having different temperatures).
  (e-3) The stretched film intermediate was fixed at both ends thereof in the transverse direction (TD) with respect to the MD, and then transferred in a non-stretched state with respect to the TD. The stretched film intermediate being transferred was subjected sequentially to first heat-treatment and second heat-treatment while it was passed through a heat-treatment device including a plurality of zones having different temperatures. At this time, the first heat-treatment was performed by raising the temperature from 20° C. to 400° C. at a temperature rise rate of 300° C./min to 350° C./min. The second heat-treatment was performed by raising the temperature from 400° C. to 600° C. at a temperature rise rate of 50° C./min to 100° C./min.
  (e-4) After completion of the heat treatment, a polyimide film having a thickness of about 50 μm was obtained.

Example 2

A polyimide film having a thickness of about 50 μm was obtained in the same manner as in Example 1, except that (e-2) in step (e) of the production method according to the present disclosure was modified as follows:
  (e-2) The produced film intermediate was placed in a tenter, and then stretched at about 160% in the machine direction (MD) by adjusting the speed of transfer rollers while being transferred to a heat-treatment device.

Example 3

A polyimide film having a thickness of about 50 μm was obtained in the same manner as in Example 1, except that (e-2) and (e-3) in step (e) of the production method according to the present disclosure were modified as follows:
  (e-2) The produced film intermediate was placed in a tenter, and then stretched at about 160% in the machine direction (MD) by adjusting the speed of transfer rollers while being transferred to a heat-treatment device.
  (e-3) First heat-treatment was performed by raising the temperature from 20° C. to 400° C. at a variable temperature rise rate of 450° C./min to 500° C./min.

Comparative Example 1

A polyimide film having a thickness of about 50 μm was obtained in the same manner as in Example 1, except that (e-1) in step (e) of the production method according to the present disclosure was modified as follows:
  (e-1) A film intermediate was produced by applying the precursor composition to an endless stainless plate in a dryer and drying the applied precursor composition at a temperature of about 110° C.

Comparative Example 2

A polyimide film having a thickness of about 50 μm was obtained in the same manner as in Example 1, except that (e-1) in step (e) of the production method according to the present disclosure was modified as follows and (e-2) was omitted:
  (e-1) A film intermediate was produced by applying the precursor composition to an endless stainless plate in a dryer and drying the applied precursor composition at a temperature of about 110° C.

Comparative Example 3

A polyimide film having a thickness of about 50 μm was obtained in the same manner as in Example 1, except that (e-1) in step (e) of the production method according to the present disclosure was modified as follows and (e-2) was omitted:
  (e-1) A film intermediate was produced by applying the precursor composition to an endless stainless plate in a dryer and drying the applied precursor composition at a temperature of about 130° C.

Comparative Example 4

A polyimide film having a thickness of about 50 μm was obtained in the same manner as in Example 1, except that (e-2) in step (e) of the production method according to the present disclosure was modified as follows and the first heat-treatment in (e-3) was modified as follows:
  (e-2) The produced film intermediate was placed in a tenter, and then stretched at about 160% in the machine direction (MD) by adjusting the speed of transfer rollers while being transferred to a heat-treatment device.
  (e-3) First heat-treatment was performed by raising the temperature from 20° C. to 400° C. at a temperature rise rate of 100° C./min to 110° C./min.

Comparative Example 5

The production of a polyimide film having a thickness of about 50 μm was attempted in the same manner as in Example 1, except that (e-2) in step (e) of the production method according to the present disclosure was modified as follows and the first heat-treatment in (e-3) was modified as follows, but the production of the polyimide film failed due to breakage of the film intermediate in the (e-3) process:
  (e-2) The produced film intermediate was placed in a tenter, and then stretched at about 160% in the machine direction (MD) by adjusting the speed of transfer rollers while being transferred to a heat-treatment device.
  (e-3) First heat-treatment was performed by raising the temperature from 20° C. to 400° C. at a temperature rise rate of 600° C./min to 650° C./min Comparative Example 6

A polyimide film having a thickness of about 50 μm was obtained in the same manner as in Example 1, except that the time interval between the additions of the second monomer in step (c) was adjusted to be shorter so that the ratio between the time required ($T_b$) in step (b), the time required ($T_c$) in step (c) and the allowing-to-stand time ($T_d$) in step (d) was 1:1:0.1.

Comparative Example 7

A polyimide film having a thickness of about 50 μm was obtained in the same manner as in Example 1, except that the allowing-to-stand time ($T_d$) in step (d) was adjusted to be longer so that the ratio between the time required ($T_b$) in step (b), the time required ($T_c$) in step (c) and the allowing-to-stand time ($T_d$) in step (d) was 1:2:0.5.

Comparative Example 8

The production of a polyimide film was attempted in the same manner as in Example 1, except that (e-1) in step (e) of the production method according to the present disclosure was modified as follows, but the production of the polyimide film failed due to breakage of the film intermediate in the (e-2) process:
  (e-1) A film intermediate was produced by applying the precursor composition to an endless stainless plate in a dryer and drying the applied precursor composition at a temperature of about 130° C.

Comparative Example 9

The production of a polyimide film was attempted in the same manner as in Example 1, except that (e-1) and (e-2) in step (e) of the production method according to the present disclosure were modified as follows, but the production of the polyimide film failed due to breakage of the film intermediate in the (e-2) process:
  (e-1) A film intermediate was produced by applying the precursor composition to an endless stainless plate in a dryer and drying the applied precursor composition at a temperature of about 110° C.
  (e-2) The produced film intermediate was placed in a tenter, and then stretched at about 160% in the machine direction (MD) by adjusting the speed of transfer rollers while being transferred to a heat-treatment device.

Comparative Example 10

The production of a polyimide film was attempted in the same manner as in Example 1, except that (e-2) in step (e) of the production method according to the present disclosure was modified as follows, but the production of the polyimide film failed due to breakage of the film intermediate in the (e-2) process:
  (e-2) The produced film intermediate was placed in a tenter, and then stretched at about 200% in the machine direction (MD) by adjusting the speed of transfer rollers while being transferred to a heat-treatment device.

TABLE 1

|  | Time ratio ($T_b$:$T_c$:$T_d$) | (e-1) drying temperature (° C.) | (e-2) elongation rate (%) | Temperature rise rate (° C./min) in first heat treatment | Film breakage |
| --- | --- | --- | --- | --- | --- |
| Example 1 | 1:2:0.1 | 90 | 130 | 300 to 350 | x |
| Example 2 | 1:2:0.1 | 90 | 160 | 300 to 350 | x |

TABLE 1-continued

|  | Time ratio ($T_b:T_c:T_d$) | (e-1) drying temperature (° C.) | (e-2) elongation rate (%) | Temperature rise rate (° C./min) in first heat treatment | Film breakage |
|---|---|---|---|---|---|
| Example 3 | 1:2:0.1 | 90 | 160 | 450 to 500 | x |
| Comparative Example 1 | 1:2:0.1 | 110 | 130 | 300 to 350 | x |
| Comparative Example 2 | 1:2:0.1 | 110 | 100 | 300 to 350 | x |
| Comparative Example 3 | 1:2:0.1 | 130 | 100 | 300 to 350 | x |
| Comparative Example 4 | 1:2:0.1 | 90 | 160 | 100 to 110 | x |
| Comparative Example 5 | 1:2:0.1 | 90 | 160 | 600 to 650 | ○ |
| Comparative Example 6 | 1:1:0.1 | 90 | 130 | 300 to 350 | x |
| Comparative Example 7 | 1:2:0.5 | 90 | 130 | 300 to 350 | x |
| Comparative Example 8 | 1:2:0.1 | 130 | 130 | 300 to 350 | ○ |
| Comparative Example 9 | 1:2:0.1 | 110 | 160 | 300 to 350 | ○ |
| Comparative Example 10 | 1:2:0.1 | 90 | 200 | 300 to 350 | ○ |

Experimental Example 1: Measurement of Molecular Orientation Ratios of Polyimide Films The molecular orientation ratios of the polyimide films produced in Examples 1 to 3 and Comparative Examples 1 to 4, 6 and 7 were measured using a microwave transmission-type molecular orientation meter MOA 7015, and the results of the measurement are shown in Table 2 below.

TABLE 2

|  | Molecular orientation ratio |
|---|---|
| Example 1 | 1.25 |
| Example 2 | 1.27 |
| Example 3 | 1.32 |
| Comparative Example 1 | 1.16 |
| Comparative Example 2 | 1.08 |
| Comparative Example 3 | 1.09 |
| Comparative Example 4 | 1.13 |
| Comparative Example 6 | 1.15 |
| Comparative Example 7 | 1.03 |

As shown in Table 2 above, the polyimide films produced according to the Examples had remarkably excellent molecular orientation ratios compared to those of the Comparative Examples, indicating that polymer chains constituting each of the polyimide films were well oriented.

Experimental Example 2: Evaluation of Thermal Conductivity of Graphite Sheet

Each of the polyimide films obtained in Examples 1 to 3 and Comparative Examples 1 to 4, 6 and 7 was heated to 1,200° C. at a rate of 1° C./min under nitrogen gas by means of an electric furnace capable of carbonization and maintained at this temperature for about 2 hours (carbonization). Then, each polyimide film was heated to 2,800° C. at a temperature rise rate of 20° C./min under argon gas by means of the electric furnace and maintained at this temperature for 8 hours, followed by cooling to obtain graphite sheets.

The thermal diffusivity of each of the graphite sheets was measured by a laser flash method using a thermal diffusivity measurement system (model name LFA 447, Netsch), and the specific heat capacity of each graphite sheet could be measured using a specific heat measurement system (model name DSC 204F1, Netsch).

The thermal conductivity of each graphite sheet was calculated by multiplying the measured thermal diffusivity and DSC values by the density (weight/volume), and the results are shown in Table 3 below.

TABLE 3

|  | Thermal conductivity (W/m · K) |
|---|---|
| Example 1 | 1402.5 |
| Example 2 | 1419.2 |
| Example 3 | 1450.6 |
| Comparative Example 1 | 1337.4 |
| Comparative Example 2 | 1331.0 |
| Comparative Example 3 | 1312.8 |
| Comparative Example 4 | 1298.4 |
| Comparative Example 6 | 1356.4 |
| Comparative Example 7 | 1255.6 |

As shown in Table 3 above, the graphite sheets produced from the polyimide films produced according to the Examples exhibited remarkably excellent thermal conductivities compared to those of the Comparative Examples. From the results in Table 3 and Table 2 above, it can be seen that the Example of the present invention is preferred for the production of a polyimide film having excellent orientation, and also plays a major role in obtaining a graphite sheet having excellent thermal conductivity.

Although the above description has been made with reference to the embodiments of the present disclosure, any person skilled in the art to which the present disclosure pertains will appreciate that various applications and modifications are possible within the scope of the present disclosure based on the above-described contents.

The invention claimed is:

1. A method for producing a graphite sheet, the method comprises a step of manufacturing a polyimide film by imidizing a polyamic acid having a weight-average molecular weight to number-average molecular weight (polydispersity index (PDI)) ratio of 1.8 to 3.0; and
   a step of carbonizing, graphitizing, or carbonizing and graphitizing the polyimide film,
   wherein the polyimide film has a molecular orientation ratio of 1.25 to 1.32 when the thickness of the polyimide film is 50 μm.

2. The method of claim 1, wherein the carbonizing is performed at a temperature of about 800° C. to about 1,500° C. for about 1 hour to about 20 hours.

3. The method of claim 1, wherein the graphitizing comprises a step of heat-treating the polyimide film by raising a temperature of the polyimide film from about 1,000° C. to a temperature of about 2,500° C. to about 3,000° C.

* * * * *